(12) United States Patent
Gombert

(10) Patent No.: US 7,118,316 B2
(45) Date of Patent: Oct. 10, 2006

(54) FIXING ELEMENT FOR INSERTING INTO A LONGITUDINAL CAVITY OF A CARRIER PLATE

(75) Inventor: Stephane Gombert, Claix (FR)

(73) Assignee: A. Raymond & CIE, Lorrach (DE)

( * ) Notice: Subject to any disclaimer, the term of this patent is extended or adjusted under 35 U.S.C. 154(b) by 0 days.

(21) Appl. No.: 10/500,094

(22) PCT Filed: Dec. 14, 2002

(86) PCT No.: PCT/EP02/14271

§ 371 (c)(1),
(2), (4) Date: Jan. 24, 2005

(87) PCT Pub. No.: WO03/060336

PCT Pub. Date: Jul. 24, 2003

(65) Prior Publication Data

US 2005/0141984 A1    Jun. 30, 2005

(30) Foreign Application Priority Data

Dec. 29, 2001  (DE) ................................ 101 64 441

(51) Int. Cl.
*F16B 21/00*  (2006.01)
(52) U.S. Cl. ................... 411/349; 411/553; 24/DIG. 53
(58) Field of Classification Search ................ 411/349, 411/549, 553; 24/DIG. 56, DIG. 53, DIG. 54, 24/580.1
See application file for complete search history.

(56) References Cited

U.S. PATENT DOCUMENTS

| 2,133,781 | A | * | 10/1938 | Johnson | 248/239 |
| 2,340,250 | A | * | 1/1944 | Murphy | 24/580.1 |
| 3,220,078 | A | * | 11/1965 | Preziosi | 411/349 |
| 3,443,783 | A | * | 5/1969 | Fisher | 248/239 |
| 4,262,394 | A | * | 4/1981 | Wright | 411/548 |
| 4,342,139 | A | * | 8/1982 | Tanaka | 24/292 |
| 4,375,879 | A | | 3/1983 | Kojima | |
| 4,467,987 | A | * | 8/1984 | Small | 248/68.1 |
| 4,705,442 | A | | 11/1987 | Fucci | |
| 4,981,405 | A | | 1/1991 | Kato | |

* cited by examiner

*Primary Examiner*—Flemming Saether
(74) *Attorney, Agent, or Firm*—Gifford, Krass, Groh, Sprinkle, Anderson & Citkowski, P.C.

(57) ABSTRACT

A fixing element of plastic is provided which includes a foot part for insertion into an oblong hole of a carrier plate. The foot part includes of a head corresponding to the edge of the oblong hole and of a shaft adapted to the width of the oblong hole. The fixing element can be locked in the oblong hole after the insertion of the head by a quarter turn under elastic deformation of the shaft. The shaft includes a middle strut connecting the head to the fixing element. The strut has the width of the oblong hole. A shank is formed on each of the two edges of the middle strut at a right angle and in opposite directions. The shank is elastically bent towards the middle strut during the screwing in of the shaft through the edge of the oblong hole and after a quarter turn returns to its original position due to the elastic return force of the plastic and prevents a rotation in the opposite direction.

3 Claims, 2 Drawing Sheets

FIXING ELEMENT FOR INSERTING INTO A LONGITUDINAL CAVITY OF A CARRIER PLATE

RELATED APPLICATIONS

This application is a U.S. national phase application under 371 of PCT Application No. PCT/EP02/14271 filed Dec. 14, 2002, which claims priority of German Application No. 101 64 441.8 filed Dec. 29, 2001.

BACKGROUND OF THE INVENTION

1. Field of the Invention

The invention relates to fixing elements consisting of plastic with a foot part for insertion into an oblong hole of a carrier plate. The foot part consists of a head corresponding to the edge of the oblong hole and of a shaft adapted to the width of the oblong hole. The fixing element can be locked in the oblong hole after the insertion of the head by a quarter turn under elastic deformation of the shaft. The shaft includes a middle strut connecting the head to the fixing element. The strut has the width of the oblong hole. A shank is formed on each of the two edges of the middle strut at a right angle and in opposite directions in such a manner that they are elastically bent towards the middle strut during the screwing in of the shaft through the edge of the oblong hole and after a quarter turn they return to their original position as a consequence of the elastic return force of the plastic and thus prevent a rotation in the opposite direction.

2. Description of Related Art

Such fixing elements are known from U.S. Pat. No. 4,981,405. The design of the fixing element with two shanks formed on a shaft at a right angle and in opposite directions opposes a certain resistance to a turning of the fixing elements opposite the direction of screwing. The fixing element advantageously reduces the risk of an unintentional loosening of the fixing element.

Other fixing elements with formed on shanks are known from U.S. Pat. No. 4,375,879 and U.S. Pat. No. 4,705,442.

DE 1 181 007 describes a fixing element of this type designed as a screw and nut in which the nut shaft that can be inserted into the oblong hole has a width corresponding to the width of the oblong hole and has stop faces running parallel to the screw axis. These stop faces work together with corresponding faces in the oblong hole so that a rotation of the nut is prevented when the screw is tightened. This nut can be readily slackened back again after the screw has been loosened and then can be withdrawn through the oblong hole.

Furthermore, there are fixing elements with a foot part of the above-cited type comparable to the nut and provided with a similarly designed shaft. However, since this foot part is not screwed down, there is the danger that the fixing element can become loose again by an unintended rotary movement.

One advantage of the present fixing element is that it is distinguished by an especially firm seat in the carrier plate.

The present invention is advantageous because it provides for a fixing element with a head having pressing ramps on its two outer ends that extend during screwing in over the edge of the oblong hole and other shanks formed on the free ends of the shanks.

The present invention is also advantageous because it provides for a fixing element having a head with pressing ramps on its two outer ends that extend during screwing in over the edge of the oblong hole and a countershank formed in the opposite direction on each of the two edges of the middle strut.

The providing of the pressing ramps and of the other shanks and countershanks results in an especially firm seat since the fixing element is firmly connected to a carrier plate by the pressing ramps after rotation in the direction of screwing in. Also, an especially great resistance is provided to prevent to an undesired rotation of the fixing elements counter to the direction of screwing in by the other shanks and countershanks.

Other features and advantages of the present invention will be readily appreciated, as the same becomes better understood after reading the subsequent description taken in conjunction with the accompanying drawings.

DESCRIPTION OF THE PREFERRED EMBODIMENTS

Figure 1:
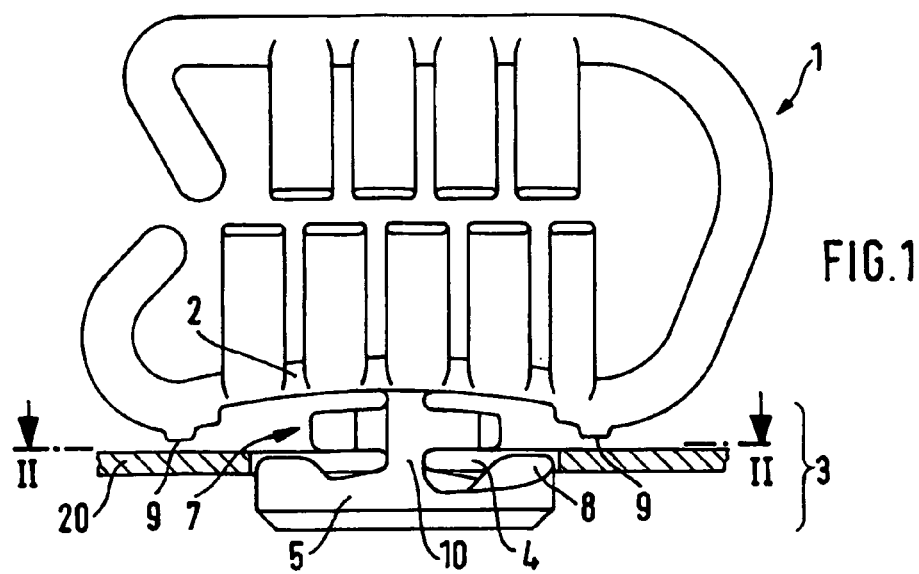
FIG. 1 shows a side view of a fixing element with foot part for anchoring in an oblong hole.
Figure 2:
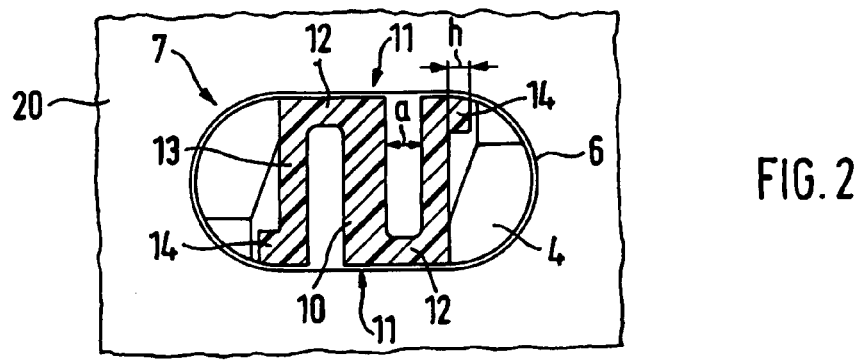
FIG. 2 shows a section through the shaft with a view onto the head inserted in the oblong hole.
Figure 3:
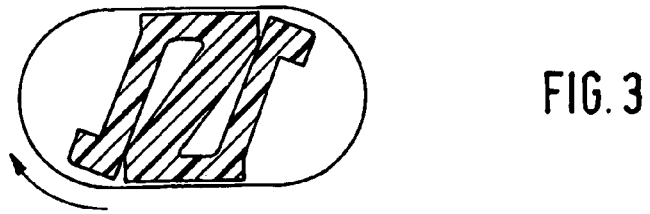
FIG. 3 shows the same section through the shaft during rotation.
Figure 4:
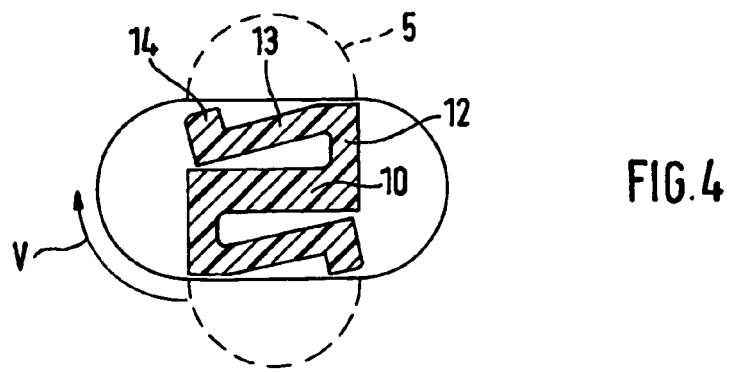
FIG. 4 shows the same section through the shaft after a completed quarter turn.

The fixing element shown in FIGS. 1 to 4 consists of an upper part 1 for holding long structural components such as, e.g., cable bundles in a clamping manner. The fixing element also includes a foot part 3 formed on its bottom plate 2 in a one-piece manner that is designed to be inserted into an oblong hole 4 of a carrier plate 20. Foot part 3 includes a head 5 adapted in its outer contour to an edge 6 of the oblong hole. The shaft 7 has the same width as the oblong hole. Head 5 can be locked after having been inserted into oblong hole 4 by a quarter turn under elastic deformation of shaft 7.

The head 5 includes pressing ramps 8 on its two outer ends that slide during screwing in over edge 6 of the oblong hole onto the back side of the carrier plate. The bottom plate includes lowest support ribs 9. The bottom plate 2 is slightly curved for this purpose and flexes upward to such an extent, that the pressing of the lowest support ribs 9 causes the pressing ramps 8 to slide under the carrier plate.

Figure 8:
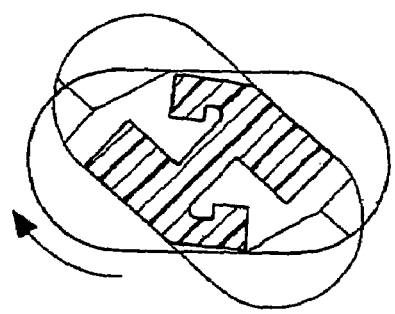
FIG. 8 shows the section through the shaft of FIG. 7 during the rotation.
Figure 9:
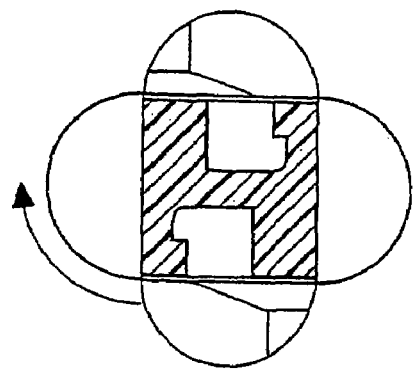
FIG. 9 shows the section through the shaft of FIG. 7 after a completed quarter turn.

The shaft 7 includes a middle strut 10 connecting the head 5 to bottom plate 2. Shanks 12 are formed at a right angle and in opposite directions on the two edges 11 of the middle strut 10. The shanks 12 are elastically bent toward the middle strut 10 during the screwing in of the shaft 7 through the edge 6 of the oblong hole (see FIGS. 3 and 8). After the quarter turn, the shanks 12 return to their original position as a consequence of the elastic return force of the plastic (see FIGS. 4 and 9). The shaft 7 cannot be turned in the opposite direction without damaging the shaft 7, since shanks 12 cannot be pressed together and also cannot otherwise yield.

In addition, the fixing element includes two other shanks 13 formed on the free ends of the elastically deformable shanks 12, parallel to middle strut 10, and extending the length of the middle strut 10. These shanks have shoulders 14 extending in opposite directions on their free ends. The length of the shoulders is equal to the distance between the middle strut 10 and shanks 13 extending parallel to it. This assures that the shanks 12 are clamped in after a quarter turn V between middle strut 10 and edge 6 of oblong hole 4, and that elastically deformable shank 12 cannot yield laterally.

Figure 5:
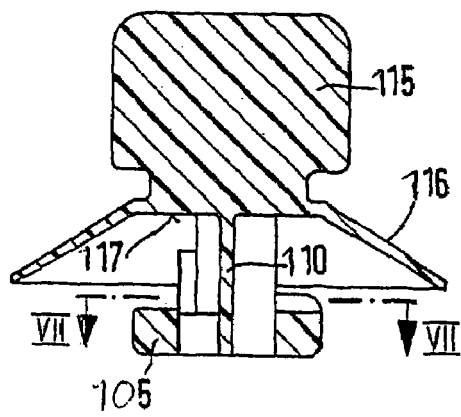
FIG. 5 shows a sectional view of another fixing element with another shaft design for connecting two plates.
Figure 6:
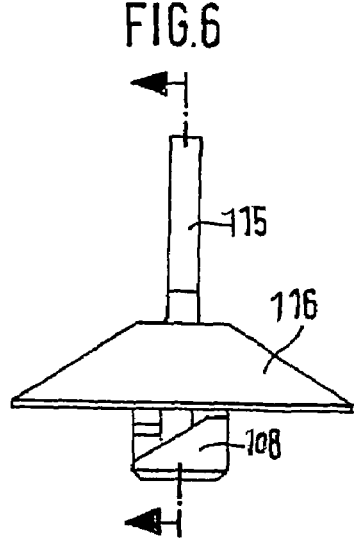
FIG. 6 shows the fixing element of FIG. 5 in a side view.
Figure 7:
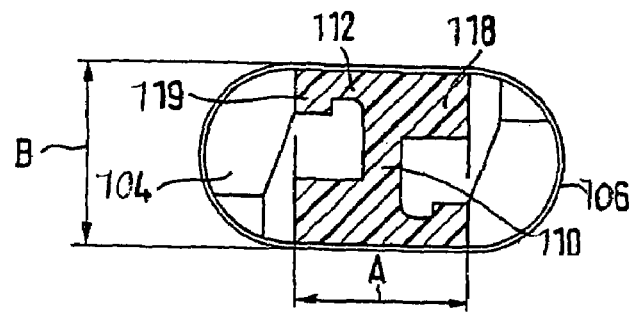
FIG. 7 shows a section through the shaft with a view onto the head inserted in the oblong hole.

In another embodiment according to FIGS. 5 and 6, a fixing element for connecting the two plates is shown with rotary handle 115 and resilient yielding support screen 116 on whose bottom plate 117 another shaft variant is formed. It should be appreciated that like features have like reference numerals increased by 100.

In this example, the shaft includes a countershank 118 formed in opposite directions on the free edges 111 of the middle strut 110. Interval "A" of both shanks 112 and of countershanks 118 corresponds to width "B" of oblong hole 104. Further, the countershank 118 is approximately twice as thick as the elastically deformable shank 112. In order to reinforce the supporting contact of the elastic shank 112, a shoulder 119 is also formed at a right angle on the free end of the shank 112, similar to shanks 13 as previously described in FIG. 2.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A fixing element of plastic for insertion into an oblong hole of a carrier plate, comprising:
   a foot part including a head corresponding in size to the edge of the oblong hole;
   a shaft adapted to the width of the oblong hole, such that the fixing element can be locked into the oblong hole after the insertion of the head by a quarter turn under elastic deformation of the shaft wherein the shaft includes a middle strut connecting to the head and the strut corresponds to the width of the oblong hole;
   a shank is formed on each of the two edges of the middle strut at a right angle and in opposite directions, such that the shanks are adapted to be elastically bent towards the middle strut during the screwing in of the shaft through the edge of the oblong hole and after a quarter turn return to their original position due to the elastic return force of the plastic;
   pressing ramps formed on the two outer ends of the head for extending during screwing in over the edge of the oblong hole to prevent a rotation in the opposite direction; and
   other shanks formed on free ends of the shanks.

2. The fixing element according to claim 1, wherein the other shanks are aligned parallel to the middle strut and extend the length of the middle strut.

3. The fixing element according to claim 2, further comprising a shoulder located on the free ends of the other shanks and extending in opposite directions, wherein the projecting height (h) of the shoulder is equal to a distance (a) between the middle strut and the other shanks running parallel to it.

* * * * *

UNITED STATES PATENT AND TRADEMARK OFFICE
CERTIFICATE OF CORRECTION

| | | |
|---|---|---|
| PATENT NO. | : 7,118,316 B2 | Page 1 of 1 |
| APPLICATION NO. | : 10/500094 | |
| DATED | : October 10, 2006 | |
| INVENTOR(S) | : Stephane Gombert | |

It is certified that error appears in the above-identified patent and that said Letters Patent is hereby corrected as shown below:

Title page, item [57] Abstract, Line 3 – replace "includes of" with -- includes --
Abstract, Line 4 – replace "and of" with -- and --

Signed and Sealed this

Thirteenth Day of February, 2007

JON W. DUDAS
*Director of the United States Patent and Trademark Office*